(12) United States Patent
Perrucci et al.

(10) Patent No.: US 12,410,693 B2
(45) Date of Patent: Sep. 9, 2025

(54) SINGLE ACTUATED ROTATIONAL ELECTRIC GAS LIFT VALVE

(71) Applicant: Schlumberger Technology Corporation, Sugar Land, TX (US)

(72) Inventors: Lucas Antonio Perrucci, Taubate (BR); Lucas Do Nascimento Sagrilo, Taubate (BR); Cassius Alexander Elston, Shreveport, LA (US); Arinta Fadly, Singapore (SG); Felipe Bauli Graziano, Taubate (BR); Eduardo Scussiato, Taubate (BR); Thomas Wakerley, Rio de Janeiro (BR)

(73) Assignee: Schlumberger Technology Corporation, Sugar Land, TX (US)

( * ) Notice: Subject to any disclaimer, the term of this patent is extended or adjusted under 35 U.S.C. 154(b) by 63 days.

(21) Appl. No.: 18/405,730

(22) Filed: Jan. 5, 2024

(65) Prior Publication Data
US 2024/0229622 A1 Jul. 11, 2024

Related U.S. Application Data

(60) Provisional application No. 63/478,719, filed on Jan. 6, 2023.

(30) Foreign Application Priority Data

Jan. 6, 2023 (SG) .......................... 10202300055V

(51) Int. Cl.
*E21B 43/12* (2006.01)
*F16K 11/02* (2006.01)
*F16K 11/16* (2006.01)

(52) U.S. Cl.
CPC .......... *E21B 43/1235* (2020.05); *F16K 11/02* (2013.01); *F16K 11/163* (2013.01); *F16K 11/165* (2013.01)

(58) Field of Classification Search
CPC ...... F16K 11/165; F16K 11/163; F16K 11/02; E21B 43/1235; E21B 43/123
See application file for complete search history.

(56) References Cited

U.S. PATENT DOCUMENTS

| 4,110,057 A | 8/1978 | McMurry |
| 5,176,164 A | 1/1993 | Boyle |

(Continued)

FOREIGN PATENT DOCUMENTS

| BR | 112012013439 A2 | 7/2018 |
| CN | 209278563 | 8/2019 |

(Continued)

OTHER PUBLICATIONS

International Search Report and Written Opinion of the PCT Application No. PCT/US2024/10506 dated May 1, 2024, 10 pages.

(Continued)

*Primary Examiner* — Atif H Chaudry
(74) *Attorney, Agent, or Firm* — Jeffrey D. Frantz

(57) ABSTRACT

An electric gas lift valve may comprise a casing, gas lift mandrel, one or more annulus, a tubing, a venturi sleeve, a needle, a governor, anti-rotational key, a rotational (rotating) bellow, a gearbox housing that houses a gearbox, an electrical motor, and an encoder. The bellow therefore allows the electrical motor, encoder and gearbox to be hermetically sealed against the external environment. Bellows that absorb torsion are provided. A bellow configured to absorb torsion comprising: a plurality of convolutions bent following a circular trajectory such that a start edge of a first convolution of the plurality of convolutions coincides with a finish edge of a last convolution of the plurality of convolutions, the start edge of the first convolution coupled to the finish edge of the last convolution.

13 Claims, 6 Drawing Sheets

(56) References Cited

U.S. PATENT DOCUMENTS

| | | |
|---|---|---|
| 5,743,717 A | 4/1998 | Schmidt |
| 5,937,945 A | 8/1999 | Bussear |
| 5,971,004 A | 10/1999 | Pringle |
| 6,070,608 A | 6/2000 | Pringle |
| 6,148,843 A | 11/2000 | Pringle |
| 6,231,312 B1 | 5/2001 | Pringle |
| 6,464,004 B1 | 10/2002 | Crawford |
| 6,852,035 B2 | 2/2005 | Tsugane |
| 6,873,267 B1 | 3/2005 | Tubel et al. |
| 7,021,388 B2 | 4/2006 | Williams |
| 7,259,688 B2 | 8/2007 | Hirsch |
| 9,670,739 B2 | 6/2017 | Tosi |
| 9,863,222 B2 | 1/2018 | Morrow |
| 9,874,091 B2 | 1/2018 | Thompson |
| 10,273,801 B2 | 4/2019 | Shah |
| 10,655,439 B2 | 5/2020 | Murdoch |
| 10,697,278 B2 | 6/2020 | Elmer |
| 11,035,201 B2 | 6/2021 | Frazier |
| 2002/0029883 A1 | 3/2002 | Vinegar et al. |
| 2004/0100037 A1 | 5/2004 | Ruebsamen |
| 2011/0186303 A1 | 8/2011 | Scott |
| 2014/0264121 A1 | 9/2014 | Jackson |
| 2016/0041132 A1 | 2/2016 | Romer |
| 2016/0145981 A1 * | 5/2016 | Qi .................... E21B 34/10 166/321 |
| 2016/0290099 A1 | 10/2016 | Balasubramanian |
| 2018/0149002 A1 | 5/2018 | Murdoch |
| 2019/0360299 A1 | 11/2019 | McAdam |
| 2020/0063525 A1 | 2/2020 | Frazier |
| 2021/0140288 A1 | 5/2021 | Lisk et al. |
| 2021/0172300 A1 | 6/2021 | Rodger |
| 2021/0293123 A1 | 9/2021 | Watson |
| 2024/0360743 A1 | 10/2024 | Perrucci |

FOREIGN PATENT DOCUMENTS

| | | |
|---|---|---|
| EP | 0745176 B1 | 4/1996 |
| EP | 1274992 A1 | 1/2003 |
| EP | 1279795 A1 | 1/2003 |
| EP | 1686235 A1 | 8/2006 |
| EP | 2666957 A2 | 11/2013 |
| EP | 3362641 A1 | 8/2018 |
| JP | H08219302 A | 8/1996 |
| WO | 2011102732 A2 | 8/2011 |
| WO | 2020223437 A1 | 11/2020 |
| WO | 2021072525 A1 | 4/2021 |
| WO | 2022173815 A1 | 8/2022 |

OTHER PUBLICATIONS

International Search Report and Written Opinion of the PCT Application No. PCT/US2024/010516 dated May 2, 2024, 13 pages.
Office Action issued in U.S. Appl. No. 18/264,615 dated Jun. 18, 2024, 20 pages.
Inaternational Search Report and Written Opinion of PCT Application No. PCT/US2022/015799 dated May 26, 2022, 12 pages.
International Preliminary Report on Patentability issued in the PCT Application No. PCT/US2022/015799 dated Aug. 24, 2023, 7, pages.
Office Action issued in U.S. Appl. No. 18/264,615 dated Feb. 12, 2025, 11 pages.

* cited by examiner

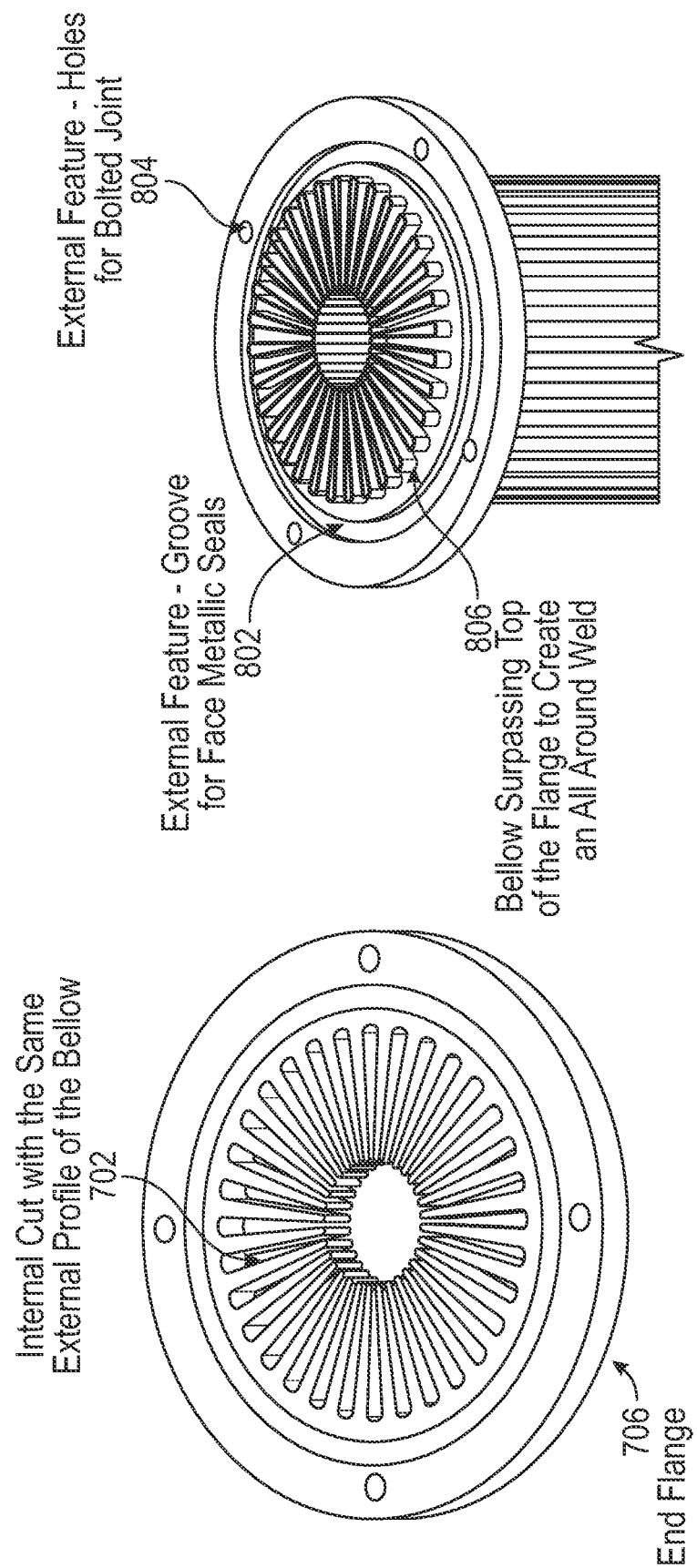

SINGLE ACTUATED ROTATIONAL ELECTRIC GAS LIFT VALVE

CROSS REFERENCE TO RELATED APPLICATIONS

This application claims the benefit of Singapore Provisional Application No. 10202300055V filed Jan. 6, 2023 and U.S. Provisional Application No. 63/478,719 filed Jan. 6, 2023, the entire contents of each are hereby incorporated by reference in their entirety.

BACKGROUND

Field

The present disclosure generally relates to a new type of gas lift valve. The present disclosure generally relates to bellows able to absorb torsion.

SUMMARY

A gas lift valve is part of a gas-lift system to control the flow of lift gas into the production tubing conduit. Gas lift systems aid or increase production by injecting high-pressure gas from the casing annulus into fluids that have entered the production tubing from the formation. The injected gas reduces the fluid density and, thus, the hydrostatic pressure of the fluid, allowing in situ reservoir pressure to lift the lightened liquids.

The gas-lift valve is located in the gas-lift mandrel, which also provides communication with the lift gas supply in the tubing annulus. Gas lift valves are the means by which operators adjust the rate of gas injection into the liquid column in the production tubing. Check valves within the gas lift valves allow flow in only one direction—from the casing annulus into the production tubing. With the technology from nowadays, if the gas flow rate is to be adjusted due to the new condition of the well, light well intervention is used in a such way to exchange the orifice size from the gas lift valve.

SLB is currently developing an electric gas lift valve. This means that electricity will be supplied to the valve and this electric power can be used to actuate the valve in their function remotely, without the need to intervene in the well. In addition, the gained feature to control the flow, the electric power can provide other functions can be incorporated as such the have never seen open and close function as well as pressure, temperature, vibration and flow sensors—valuable data to the well operator.

In some configurations, a bellows configured to absorb torsion includes a plurality of convolutions bent following a circular trajectory such that a start edge of a first convolution of the plurality of convolutions coincides with a finish edge of a last convolution of the plurality of convolutions, the start edge of the first convolution coupled to the finish edge of the last convolution.

The start edge of the first convolution can be welded to the finish edge of the last convolution. A ration of an external diameter of the bellows to a length of the bellows can be approximately 1/10. The bellows can further include an end flange coupled to each end of the bellows. Each end flange can include a plurality of internal cuts configured to receive the plurality of convolutions of the bellows. Each end flange can be inserted onto a respective end of the bellows until the respective end of the bellows protrudes from the end flange. The end flanges can be welded to the bellows. The bellows can be incorporated into an electric gas lift valve or another type of valve, for example, for downhole oil and gas completions.

BRIEF DESCRIPTION OF THE FIGURES

Certain embodiments, features, aspects, and advantages of the disclosure will hereafter be described with reference to the accompanying drawings, wherein like reference numerals denote like elements. It should be understood that the accompanying figures illustrate the various implementations described herein and are not meant to limit the scope of various technologies described herein.

FIG. 7 shows an end flange.

FIG. 8 shows the end flange of FIG. 7 coupled to the bellows of FIGS. 5-6.

DETAILED DESCRIPTION

In the following description, numerous details are set forth to provide an understanding of some embodiments of the present disclosure. It is to be understood that the following disclosure provides many different embodiments, or examples, for implementing different features of various embodiments. Specific examples of components and arrangements are described below to simplify the disclosure. These are, of course, merely examples and are not intended to be limiting. However, it will be understood by those of ordinary skill in the art that the system and/or methodology may be practiced without these details and that numerous variations or modifications from the described embodiments are possible. This description is not to be taken in a limiting sense, but rather made merely for the purpose of describing general principles of the implementations. The scope of the described implementations should be ascertained with reference to the issued claims.

As used herein, the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down"; "upper" and "lower"; "top" and "bottom"; and other like terms indicating relative positions to a given point or element are utilized to more clearly describe some elements. Commonly, these terms relate to a reference point at the surface from which drilling operations are initiated as being the top point and the total depth being the lowest point, wherein the well (e.g., wellbore, borehole) is vertical, horizontal or slanted relative to the surface.

The present disclosure generally relates to a new type of gas lift valve. The technology described herein takes advantage of electric power to change how the gas lift valve functions in order to increase reliability of the gas lift valve and provided extra functionality to the operator. This application discloses, among other technical features: a nozzle with adjustable stroke, a venturi to work with the nozzle choking the passage of the gas, a quarter turn open and close to completely interrupt the passage of the gas, an electric motor to actuate both functions as above, a method to combine both functions using a single electric motor.

Figure 1:
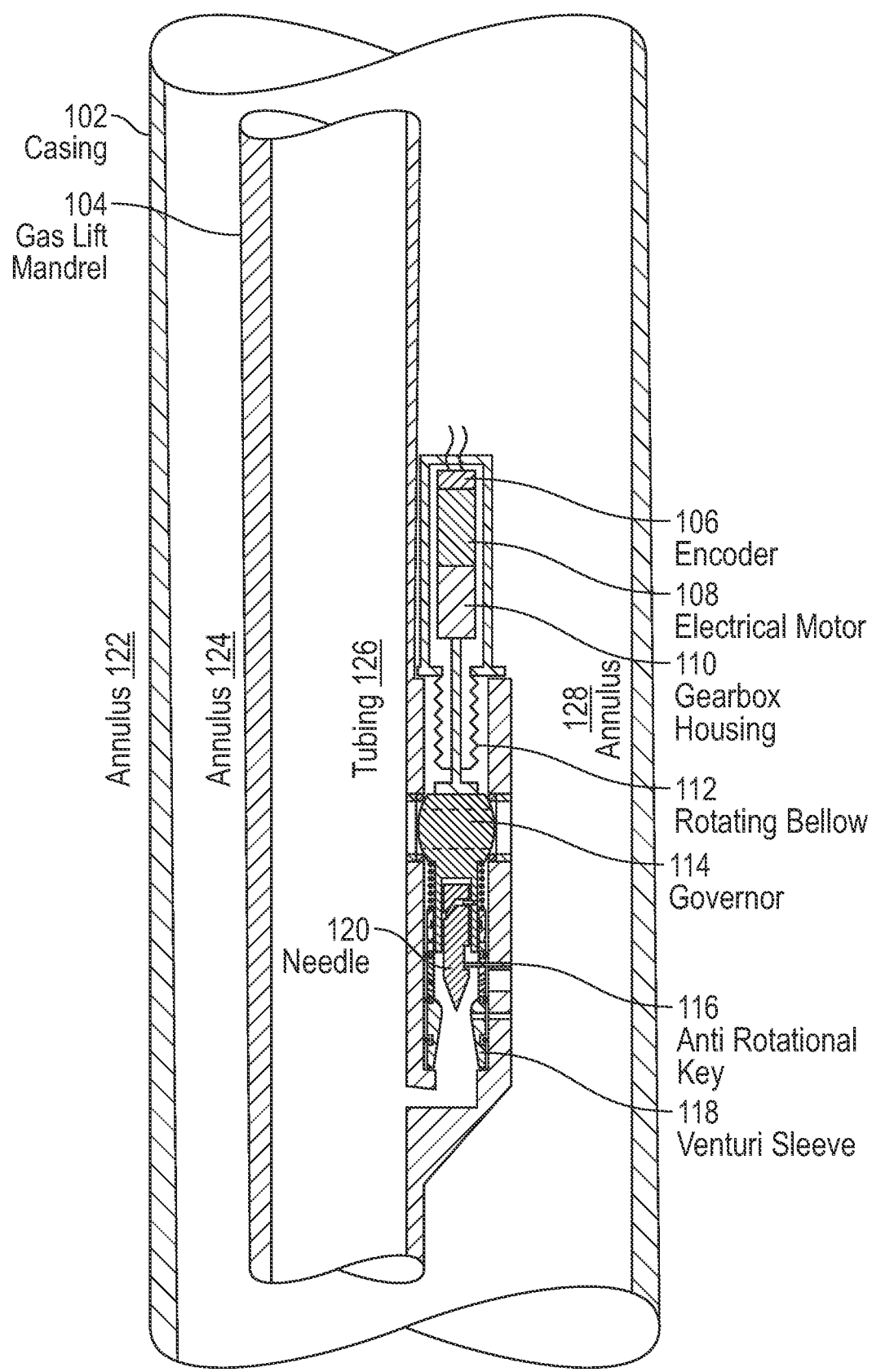
FIG. 1 shows a longitudinal well cross section of an electric gas lift valve.

As shown in FIG. 1, in some configurations, the electric gas lift valve may comprise a casing 102, gas lift mandrel 104, one or more annulus 122, 124, 128, a tubing 126, a venturi sleeve 118, a needle 120, a governor 114, anti-rotational key 116, a rotational (rotating) bellow 112, a gearbox housing 110 housing a gearbox, an electrical motor 108, and an encoder 106. The rotational bellow 112 may be metallic. A first end of the bellow 112 can be coupled, e.g., welded, to the housing 110, and an opposite second end of the bellow 112 can be coupled, e.g., welded, to an output shaft of the gearbox. The bellow therefore allows the electrical motor, encoder 106, and gearbox to be hermetically sealed against the external environment.

In some configurations, the gearbox output shaft is configured to rotate ¼ turn in each direction relative to neutral. A first end of the gearbox output shaft is coupled to the gearbox. An opposite second end of the gearbox output shaft extends beyond the second end of the bellow and is coupled to the governor. The governor can therefore rotate quarter turns along with the gearbox output shaft.

Figure 2:
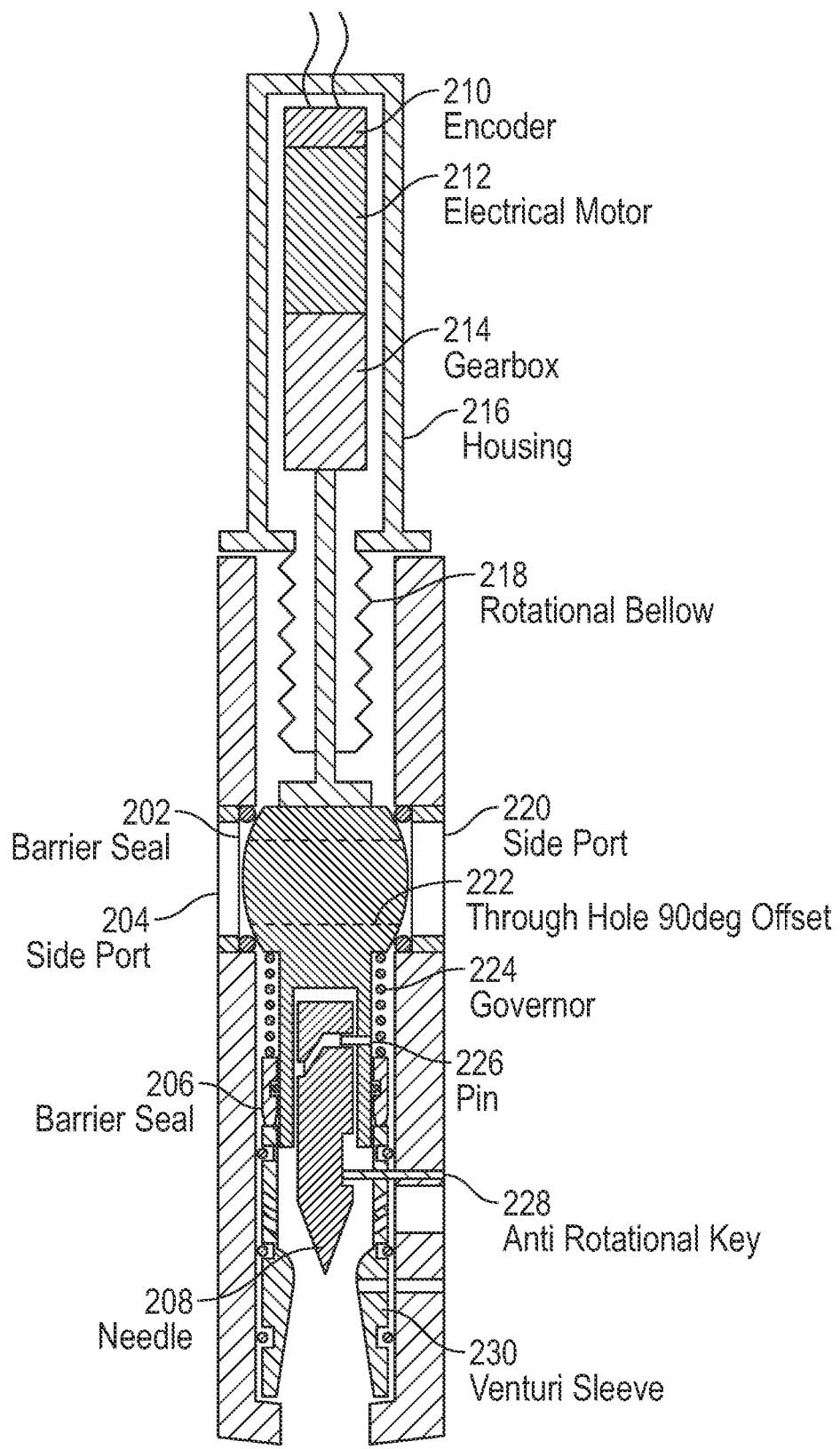
FIG. 2 shows an orthogonal cross section of an electric gas lift valve.

As shown in FIG. 2, an electric gas lift valve may comprise an encoder 210, electrical motor 212, gearbox 214, housing 216, rotational bellow 218, barrier seal 202, 206, side port 220, 204, a through hole 222 (e.g., approximately 90 degree offset), a governor 224, a pin 226, anti-rotational key 228, needle 208, and a venturi sleeve 230.

In FIG. 2 (and in other embodiments, e.g., FIG. 1), an upper portion of the governor 224 can be at least partially spherical or ball shaped as shown. A lower portion of the governor 224 extending from the upper portion can be generally tube shaped. The upper portion includes a through hole 22. When the governor 224 is rotated such that the through hole 222 aligns with side ports of the mandrel, gas can flow from one side to the other through the side ports and through hole 222. Barrier seals 202, 206 are disposed between the upper portion ball and the side ports to prevent or inhibit the gas from spreading outwards. When the governor 224 is rotated a quarter turn, the through hole is not aligned with the side ports 204, 220, and the ball blocks the passage of gas. This quarter turn mechanism of the gearbox 214 output shaft and governor 224 opens and closes the valve. This can allow the valve to be kept closed in the early production years of the well when gas is not needed to assist production. As bottom hole pressure is reduced after years of production and gas is targeted, the valve can be opened without intervention, rather than using a dummy valve in the early years that was replaced by a gas lift valve via intervention.

The lower half of the governor 224 partially houses the needle. A portion of the needle 208 is disposed within the venturi sleeve. The needle 208 has a longitudinal side slot. An anti-rotation key 228 anchored to the mandrel extends into the side slot of the needle 208. The needle 208 can therefore only move axially, as rotation of the needle 208 is constrained by the engagement of the anti-rotation key 228 in the side slot. The needle may also comprise a taper slot that receives a pin anchored in the lower half of the governor 224. As the governor 224 rotates, the pin 226 drives the needle 208 to move outward/downward or inward/upward relative to the governor 224. The needle 208 therefore moves toward or away from the venturi throat, thereby decreasing or increasing the flow.

Figure 3:
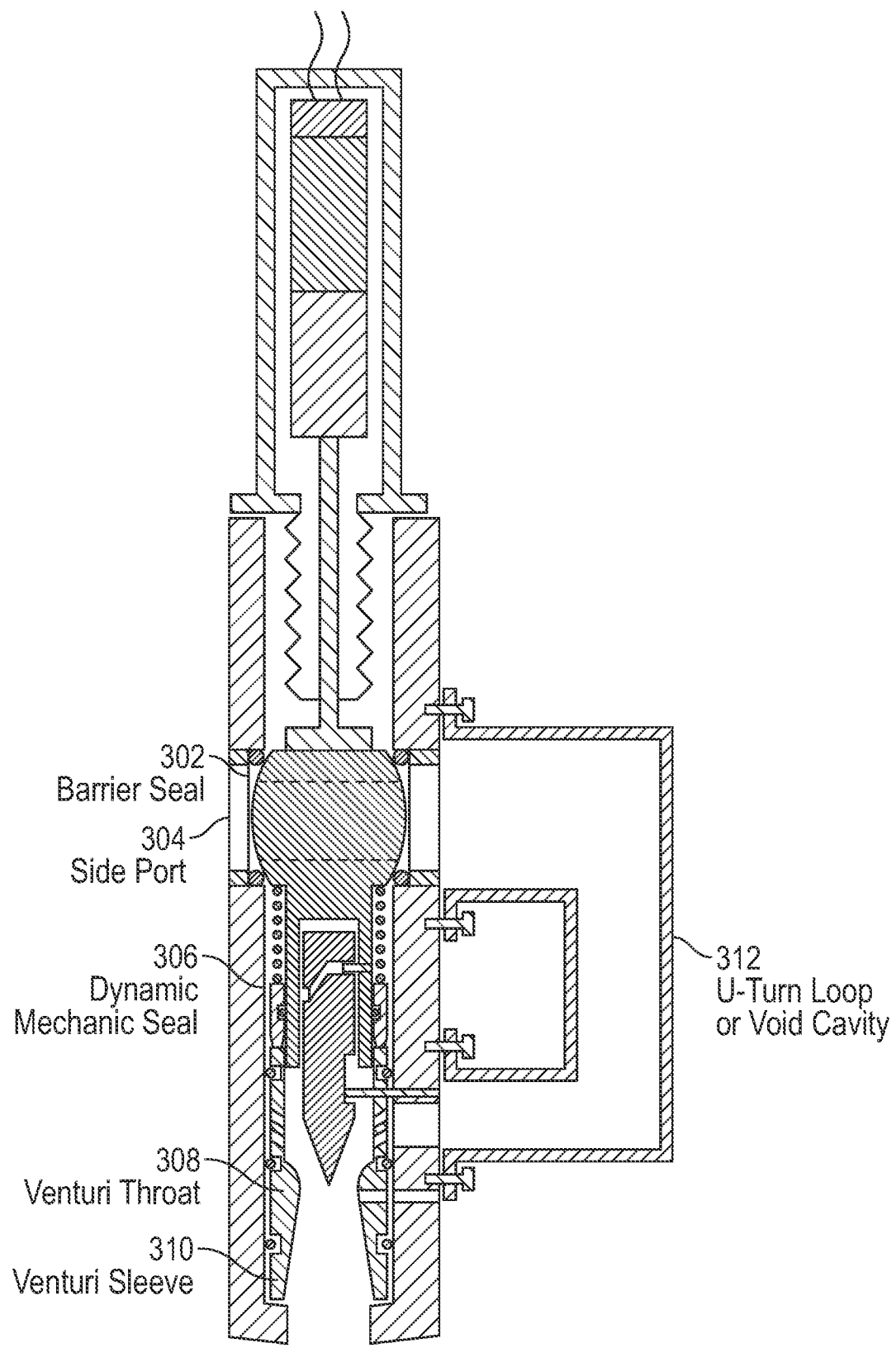
FIG. 3 shows another orthogonal cross section of an electric gas lift valve comprising a U-turn loop for the gas flow.

Turning to FIG. 3, in use, if the gearbox output shaft and governor ball are rotated to the open position such that the through hole of the governor ball is aligned with the side ports, the gas can flow from the annulus, through a first side port 304 through the through hole, through the second side port 304, and into a U-turn loop 312 or transfer cavity that directs the gas toward the flow control device. A U-turn loop 312 can be formed using pipes, elbows, and end flanges sealed with the mandrel body, as shown in FIG. 3. In other configurations, a transfer cavity can be formed via a void space in the mandrel body. After flowing through the U-turn loop or transfer cavity, the gas reaches the venturi sleeve 310. As the needle moves closer to and into the venturi throat, the cross-sectional area is reduced, thereby reducing the flow rate of the gas for a given pressure. After the gas passes through the venturi throat 308, the gas reaches the tubing zone, where the gas can mix with production fluid to lighten the fluid density and hydrostatic pressure of the fluid, allowing in situ reservoir pressure to lift the lightened liquids.

Seals are disposed on the exterior of the venturi sleeve to contain the gas in different pressure zones for different purposes. A first pressure zone is formed between upper and central seals. The first pressure zone restricts gas coming from the U-turn loop or transfer cavity so that the gas passes through taper holes formed in the venturi sleeve. A second pressure zone is formed between the central and lower seals. The second pressure zone is configured for pressure probe.

A seal may also be disposed to seal between the venturi chamber and the annulus of the governor (outside the governor, between the governor and the mandrel pocket) to prevent gas from flowing through the governor annulus and through the annulus between the ball and the inner diameter of the external pocket to the exterior of the rotational bellow. In the case of reverse flow with the valve in the closed position, the pressure in the venturi chamber could be higher or lower than the annulus pressure. The inside of the bellow and housing is the same as the annulus pressure. Depending on the pressure delta, the bellow could be damaged. A seal is therefore included between the venturi chamber and the governor annulus. As the governor rotates relative to the pocket, a dynamic mechanic seal 306 could be used.

The taper holes in the venturi sleeve help direct gas entering the pre-venturi chamber toward the venturi throat. This can help condition the gas to a smooth flow. A side through hole in the pocket connects to the second pressure zone and can allow for measuring with a first pressure probe. A second pressure probe can be located in the annulus. The first and second pressure probes allow for measuring the gas flow rate with further post-processing.

The use of an electric actuator to control a variable orifice advantageously allows a changeable and precise flow area opening. This gives the operator flexibility with respect to the flow rate and pressure drop through the completion. The flapper back check system advantageously increases reliability for the back check sealing mechanism. The flow tube is used as a conduit for the flow. The flow tube can therefore prevent or inhibit flow from eroding or damaging the seals or seal surfaces. The flow tube flapper back check system is more robust than a poppet style back check valve. The open/close state of the valve does not depend on the well environment. Instead, the valve is opened or closed automatically or on command of the operator. Opening or closing can be triggered with a button. In other configurations, data from pressure sensors in the tubing and/or annulus can be used to automatically trigger closure or opening of the valve. Valves and systems according to the present disclosure can advantageously be low power as the motor uses a braking system to hold in place, and a low power electro-magnet coupling is used in the fail-close mechanism. The valve or system is more reliable than existing systems, which may allow for eliminating the complexity of including a retrieval system. This can advantageously reduce cost and reduce manufacturing difficulty.

In configurations in which a single motor actuates to provide both the open/close mechanism and variable orifice adjustment, use of a single motor can help increase reliability of the system. In some configurations, the open and close function of the valve is provided by the motor shaft rotating ¼ turn in one direction, and the flow control function of the valve is provided by the motor shaft moving ¼ turn in an opposite direction. As the needle moves axially in response to a rotation of the governor without the need for a linear actuator, the system may not utilize an axial bellow with a large compensation system. As the needle and needle actuating mechanism are disposed in a single pressure chamber, barrier seals 302 may not be used as would normally be needed outside the chamber for the actuation mechanism. The rotational system can advantageously provide increased system reliability and improved performance against scale and debris.

The present disclosure provides bellows that may absorb torsion forces. In some configurations, bellows according to the present disclosure can be used in oil and gas completions, for example, electric valves such as electric gas lift valves (e.g., in FIGS. 1-3). Once an oil and gas well is finished, the well is completed to start producing. Various completions equipment components are deployed, such as flow control valves, safety valves, production packers, chemical injection systems, and gas lift systems and valves. Valves are traditionally operated via hydraulic pressure, so control lines are also used. Hydraulically operated valves use hydraulic seals. As completion equipment is designed to last e.g., a 20-year lifetime without intervention, reliability of hydraulic seals is important. In electric completions, electro-mechanical systems can replace hydraulically actuated valves. Sensitive equipment is embedded in the systems, such as the electric motor, gearbox, actuator, encoder, electrical wires, and electronics. To preserve the lifetime of these components, these components can be encapsulated into a metallic housing and hermetically sealed.

The linear actuator in the housing may actuate, expanding and contracting the actuator rod extending outside the housing. Therefore, a flexible component is coupled to the housing to allow such expansion and contraction while keeping the sensitive components sealed. Bellows according to the present disclosure can provide this flexible component. The bellows may be metallic.

Conventional linear bellows provide axial deflection, and therefore allow the rod to protrude axially outside the housing, while keeping the housing hermetically sealed. Bellows according to the present disclosure can absorb torsion with respect to the center line. This functionality provides technical and commercial advantages, particularly in systems employing rotary actuation mechanisms and that use components to be hermetically sealed in housings with a protruding rod capable of angular displacement.

Bellows according to the present disclosure can have a unique body configured to deflect torsion between the ends when an external source or torque or angular displacement is applied at one of the ends relative to the central line, while maintaining sealability between the inner and outer environments.

Figures 4, 5:
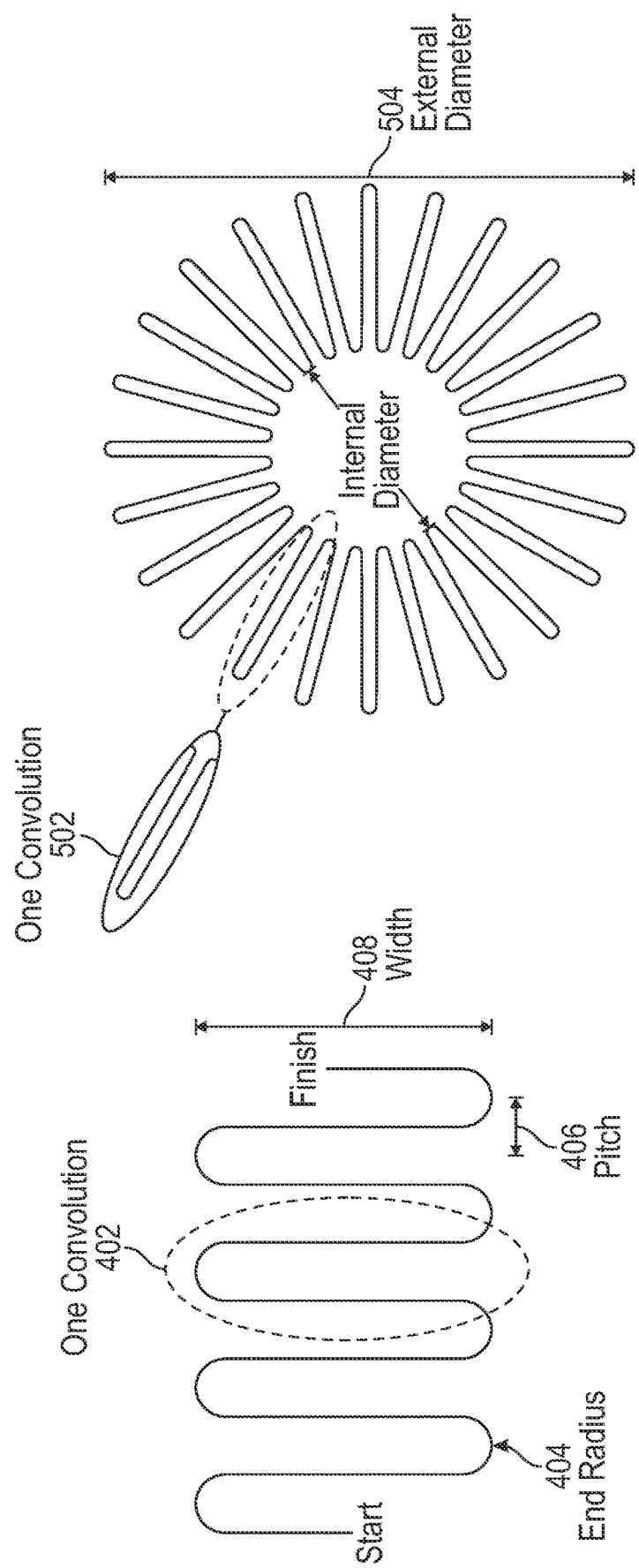
FIG. 4 shows portions of convolutions forming an example bellows according to the present disclosure.
FIG. 5 shows a transverse cross-section of an example bellows according to the present disclosure.

Turning to FIG. 4, in some configurations, as shown in the cross-sectional view, a long and thin metallic material may be molded or shaped to form multiple waves having predefined physical form characteristics, such as width 408, pitch 406, bend radius 404, number of convolutions 402, and/or start and finish points. The convolutions 402 are bent following a circular trajectory such that the start edge of a first wave coincides with a finish edge for a last wave as shown.

Figure 6:
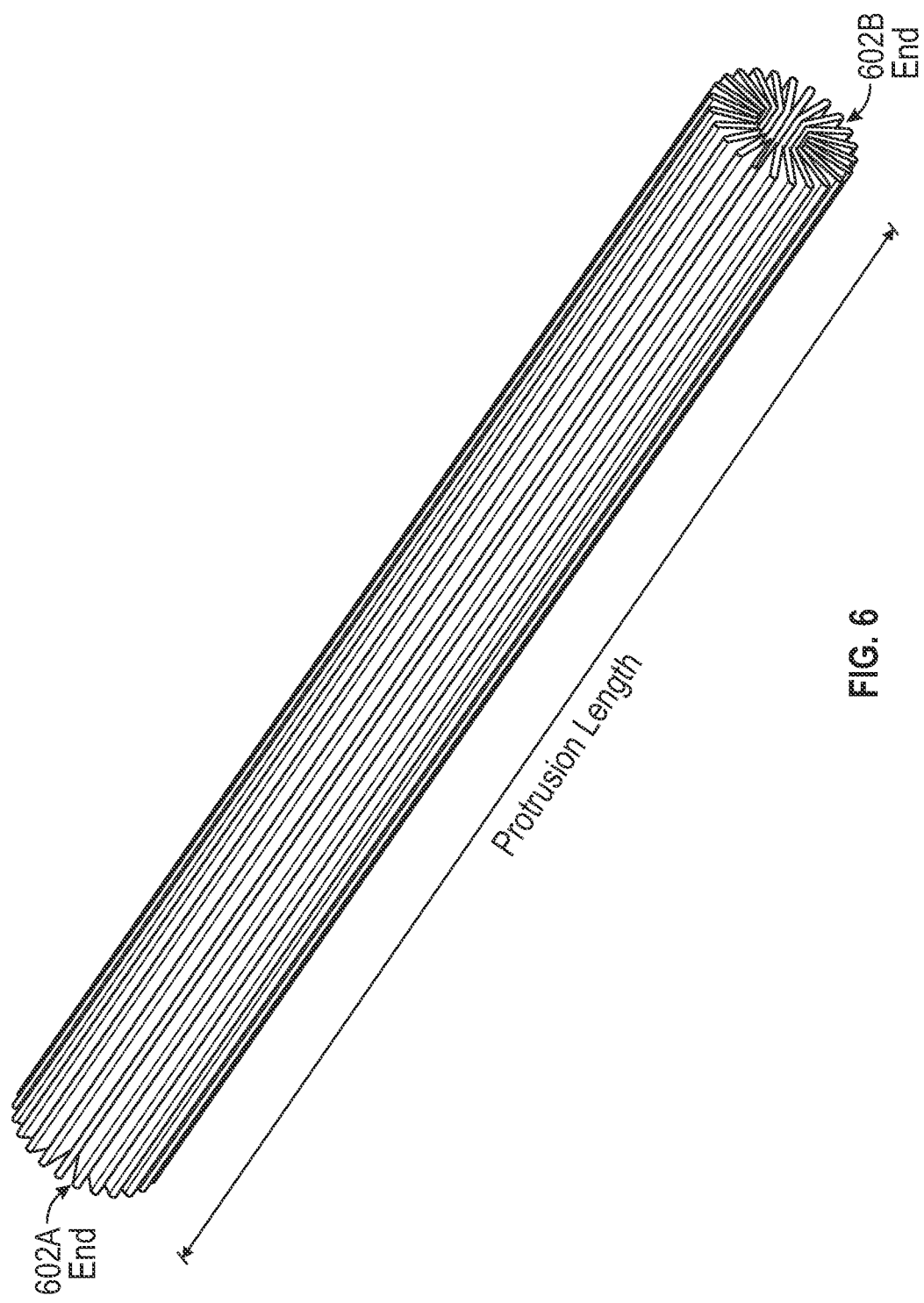
FIG. 6 shows a perspective view of the bellows of FIG. 5.

Turning to FIG. 5, the union between the start edge of the first wave and the finish edge of the last wave can be joined, e.g., welded, to form the bellow. The bellow has an external diameter 504 and an internal diameter. Turning to FIG. 6, the width of the convolutions can be an important characteristic to provide torsion elasticity and angular deflection between the ends 602A, 602B of the bellow. A ratio between the external diameter and the length can be an order of 1/10. Such a ratio can advantageously achieve an angular deflection of ¼ turn. If a greater angular deflection is desired, a longer protrusion length may be used.

A bellow as described herein can be used in various devices, including valves for oil and gas completions, such as electric flow control valves, electric safety valves, and electric gas lift valves. In some such configurations, the ends of the bellow is coupled to other components of the valve or other device, such as the housing containing the linear actuator at one end, and an opposite end of the actuator rod at the other end. Turning to FIG. 7, end flanges 706 can be coupled, e.g., welded, to ends of the bellow to allow for sealability.

Because the width of the convolutions is relative tall and the pitch of the convolutions is narrow, welding could be challenging. To ease manufacturability, the end flanges 706 can include internal cuts 702 (e.g., having a profile corresponding to the external profile of the bellow).

Turning now to FIG. 8, the end flange (e.g., 706) may be inserted into or onto the end of the bellow until the end of the bellow protrudes from the end flange to create an all-around cord of weld 806. A second end flange may be inserted into or onto the opposite end of the bellow until the end of the bellow protrudes from the end flange to allow for an all-around cord of weld. The geometric shape and/or external features of the flanges may be adapted and configured to be coupled to the respective components of the valve or other device, such as the housing and actuator rod. The end flange 706 may comprise various external features. For example, the end flange 706 may comprise a groove for face metallic seals 802 and/or holes for belted joints 804.

Bellows according to the present disclosure advantageously allow for the use of rotary actuation systems. These bellows can provide improved system reliability and/or reduced cost due to fewer components used to build a rotary actuation system to actuate a valve compared to a linear actuation system. Bellows as described herein may be less sensitive to scale. With a linear actuator, the seal of the valve may axially slide through a cylinder. If there is scale in the path of the seals, the actuation system is designed to be strong enough to break the scale, or the system may not work. A rotary system can include circumferential seals, which always stay in contact with the circumference and therefore prevent scale from growing in the seal path.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately," "about," "generally," and "substantially" may refer to an amount that is within less than 10% of, within less than 5% of, within less than 1% of, within less than 0.1% of, and/or within less than 0.01% of the stated amount. As another example, in certain embodiments, the terms "generally parallel" and "substantially parallel" or "generally perpendicular" and "substantially perpendicular" refer to a value, amount, or characteristic that departs from exactly parallel or perpendicular, respectively, by less than or equal to 15 degrees, 10 degrees, 5 degrees, 3 degrees, 1 degree, or 0.1 degree.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims. It is also contemplated that various combinations or sub-combinations of the specific features and aspects of the embodiments described may be made and still fall within the scope of the disclosure. It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above.

What is claimed is:

1. An electric gas lift valve comprising:
   a mandrel comprising side ports;
   one or more annulus configured for gas flow;
   a venturi sleeve;
   one or more seals disposed on the exterior of the venturi sleeve to contain the gas in different pressure zones;
   a needle comprising a longitudinal side slot;
   a governor comprising an upper portion that is at least partially spherical and comprises a through hole, and a lower portion extending from the upper portion, wherein:
      the lower portion is at least partially tube-shaped;
      the through hole comprises an offset;
      the lower portion of the governor partially houses the needle; and
      a portion of the needle is disposed within the venturi sleeve;
   an anti-rotational key that is anchored to the mandrel and extends into the longitudinal side slot of the needle;
   a transfer cavity; and
   a rotational bellow, wherein the rotational bellow is configured to absorb torsion, the rotational bellow comprising:
      a plurality of convolutions bent following a circular trajectory such that a start edge of a first convolution of the plurality of convolutions coincides with a finish edge of a last convolution of the plurality of convolutions, the start edge of the first convolution being coupled to the finish edge of the last convolution.

2. The electric gas lift valve of claim 1, wherein the governor is configured to allow gas flow from one side to another side through the side ports of the mandrel when the through hole rotates to align the through hole with the side ports of the mandrel.

3. The electric gas lift valve of claim 1, wherein when the governor is rotated a quarter turn, the through hole is configured to not be aligned with the side ports of the mandrel and the upper portion of the governor that is at least partially spherical is configured to block a passage of gas.

4. The electric gas lift valve of claim 1, wherein barrier seals are disposed between the upper portion of the governor that is at least partially spherical and the side ports of the mandrel to prevent gas from spreading outwards.

5. The electric gas lift valve of claim 1, wherein the needle comprises a taper slot that receives a pin anchored in the lower portion of the governor, wherein when the governor rotates, the pin drives the needle downward toward the venturi sleeve or upward away from the venturi sleeve, thereby decreasing or increasing a flow of gas.

6. The electric gas lift valve of claim 1, wherein the upper portion of the governor that is at least partially spherical is configured to rotate to an open position, wherein the through hole of the governor is aligned with the side ports of the mandrel, such that gas flows from the one or more annulus and at least one of the side ports of the mandrel into the transfer cavity.

7. The electric gas lift valve of claim 6, wherein the transfer cavity is configured such that gas, after flowing through the transfer cavity, reaches the venturi sleeve.

8. The electric gas lift valve of claim 1, wherein the needle is configured such that as the needle moves closer to a venturi throat, a cross-sectional area is reduced, thereby reducing a flow rate of gas, such that after the gas passes through the venturi throat, the gas reaches a tubing zone where the gas mixes with a production fluid to lighten a fluid density and hydrostatic pressure of the fluid.

9. The electric gas lift valve of claim 1, comprising a first pressure zone restricting gas coming from the transfer cavity so that the gas passes through taper holes formed in the venturi sleeve, and a second pressure zone formed between central and lower seals.

10. The electric gas lift valve of claim 1, wherein that transfer cavity is formed using a void space in the mandrel, or by using pipes, elbows, or end flanges sealed with the mandrel.

11. The electric gas lift valve of claim 1, wherein a seal of the one or more seals disposed on the exterior of the venturi sleeve is disposed between a venturi chamber and the annulus, such that taper holes in the venturi sleeve direct gas entering a pre-venturi chamber toward a pre venturi throat.

12. The electric gas lift valve of claim 1, wherein the needle is configured to move axially, wherein a rotation of the needle is configured to be constrained by an engagement of the anti-rotation key in the longitudinal side slot.

13. An electric gas lift valve comprising:
   a mandrel comprising side ports;
   one or more annulus configured for gas flow;
   a venturi sleeve;
   one or more seals disposed on the exterior of the venturi sleeve to contain the gas in different pressure zones;
   a needle comprising a longitudinal side slot;
   a governor comprising an upper portion that is at least partially spherical and comprises a through hole, and a lower portion extending from the upper portion, wherein:
      the lower portion is at least partially tube-shaped,
      the through hole comprises an offset, and
      the needle comprises a taper slot that receives a pin anchored in the lower portion of the governor, wherein when the governor rotates, the pin drives the needle downward toward the venturi sleeve or upward away from the venturi sleeve, thereby decreasing or increasing a flow of gas;

an anti-rotational key that is anchored to the mandrel and extends into the longitudinal side slot of the needle;

a transfer cavity; and a rotational bellow, wherein the rotational bellow is configured to absorb torsion, the rotational bellow comprising:

a plurality of convolutions bent following a circular trajectory such that a start edge of a first convolution of the plurality of convolutions coincides with a finish edge of a last convolution of the plurality of convolutions, the start edge of the first convolution being coupled to the finish edge of the last convolution.

* * * * *